United States Patent [19]
Bartlett et al.

[11] Patent Number: 5,496,615
[45] Date of Patent: Mar. 5, 1996

[54] WATERPROOFING MEMBRANE

[75] Inventors: Keith R. Bartlett, Groveland; Robert F. Jenkins, Wakefield, both of Mass.; Christopher Buss, Le Port Marly, France; Timothy J. Martin, Loxwood, England; Andre Gerber, Hong Lok Yuen, Hong Kong; Peter C. Colarusso, Saugus, Mass.

[73] Assignee: W. R. Grace & Co.-Conn., New York, N.Y.

[21] Appl. No.: 137,310

[22] Filed: Oct. 15, 1993

Related U.S. Application Data

[63] Continuation-in-part of Ser. No. 931,121, Aug. 17, 1992, Pat. No. 5,316,848, which is a continuation of Ser. No. 662,853, Mar. 1, 1991, abandoned.

[51] Int. Cl.⁶ .................................................. C09J 7/02
[52] U.S. Cl. ........................ 428/144; 428/148; 428/150; 428/351; 428/354
[58] Field of Search ..................... 428/351, 354, 428/40, 144, 148, 150

[56] References Cited

U.S. PATENT DOCUMENTS

| | | | |
|---|---|---|---|
| 3,087,515 | 4/1963 | Venable | 138/145 |
| 3,207,619 | 9/1965 | Klimboff | 117/27 |
| 3,642,559 | 2/1972 | Stokes | 161/38 |
| 3,661,695 | 5/1972 | Berliner | 161/151 |
| 3,663,350 | 5/1972 | Stokes | 161/151 |
| 3,741,856 | 6/1973 | Hurst | 161/88 |
| 3,819,394 | 6/1974 | Schnebel, Jr. et al. | 117/6 |
| 3,853,682 | 12/1974 | Hurst | 161/92 |
| 3,900,102 | 8/1975 | Hurst | 206/411 |
| 4,065,924 | 1/1978 | Young | 61/7 |
| 4,091,135 | 5/1978 | Tajima et al. | 428/40 |
| 4,151,025 | 4/1979 | Jacobs | 156/71 |
| 4,357,377 | 11/1982 | Yamamoto | 428/40 |
| 4,374,687 | 2/1983 | Yamamoto | 156/71 |
| 4,386,981 | 6/1983 | Clapperton | 156/71 |
| 4,421,807 | 12/1983 | Clausing et al. | 428/41 |
| 4,464,215 | 8/1984 | Cogliano | 156/71 |
| 4,464,427 | 8/1984 | Barlow | 428/40 |
| 4,585,682 | 4/1986 | Colarusso et al. | 428/57 |
| 4,588,458 | 5/1986 | Previsani | 156/71 |
| 4,589,804 | 5/1986 | Paeglis et al. | 405/270 |
| 4,636,414 | 1/1987 | Tajima et al. | 428/40 |
| 4,657,435 | 4/1987 | Chang | 405/136 |
| 4,670,071 | 6/1987 | Cooper et al. | 156/71 |
| 4,755,409 | 7/1988 | Harkness | 428/40 |
| 4,775,567 | 10/1988 | Harkness | 428/40 |
| 4,789,578 | 12/1988 | Twyford et al. | 428/40 |
| 4,810,573 | 3/1989 | Harriett | 428/331 |
| 4,837,095 | 6/1989 | Hageman | 428/287 |

(List continued on next page.)

FOREIGN PATENT DOCUMENTS

| | | |
|---|---|---|
| 0989257 | 8/1972 | Canada. |
| 0501838A2 | 9/1992 | European Pat. Off.. |

OTHER PUBLICATIONS

Bituthene®Pre-Pour™ Membrane; The First Truly Effective Blind Side Waterproofing System; Copyright 1993; W. R. Grace & Co.-Conn.

ANS/ATM Standard Test Method for Penetration of Bituminous Materials (pp. 88–92).

*Primary Examiner*—Jenna L. Davis
*Attorney, Agent, or Firm*—Craig K. Leon; William L. Baker

[57] ABSTRACT

An exemplary waterproofing membrane comprises a carrier layer having a non-bituminous pressure-sensitive waterproofing adhesive, a protective layer coated on the non-bituminous adhesive, and a second waterproofing adhesive layer on the other face of the carrier to permit adherence of the membrane to a cementious surface and to permit concrete to be cast against the non-bituminous layer and protective coating and to be bonded thereto when cured. Further exemplary membranes comprise a dusted layer on the protective coating to permit foot traffic. The membranes of the invention are useful in so-called horizontal and vertical lagging installations. Methods for waterproofing between cementious surfaces, in tunnels, and on concrete decks are also disclosed.

12 Claims, 2 Drawing Sheets

U.S. PATENT DOCUMENTS

| | | | |
|---|---|---|---|
| 4,948,652 | 8/1990 | Kelleher et al. | 422/110 |
| 4,994,328 | 2/1991 | Cogliano | 428/489 |
| 5,032,197 | 7/1991 | Trimble | 156/71 |
| 5,096,775 | 3/1992 | Sato et al. | 428/327 |
| 5,132,183 | 7/1992 | Gaidis et al. | 428/489 |
| 5,178,946 | 1/1993 | Sato et al. | 428/412 |
| 5,206,068 | 4/1993 | Kalkanoglu | 428/143 |
| 5,271,781 | 12/1993 | Anno et al. | 156/71 |

WATERPROOFING MEMBRANE

The present application is a continuation-in-part application of Ser. No. 07/931,121, filed Aug. 17, 1992, issued as U.S. Pat. No. 5,316,848 on May 31, 1994, which application was a file wrapper continuation of Ser. No. 07/662,853 filed Mar. 1, 1991, abandoned.

FIELD OF THE INVENTION

The present invention relates to compositions and methods useful for waterproofing or dampproofing various water-penetrable materials used in building construction and other civil engineering projects. More particularly, the present invention relates to novel waterproofing membranes comprised of a carrier sheet, a bituminous or non-bituminous adhesive layer, a protective layer coating on said adhesive layer, and a second bituminous or non-bituminous adhesive layer located on the other side of said carrier layer. Other exemplary membranes comprise a carrier layer, a bituminous or non-bitiminous adhesive layer, a protective coating layer, and a layer comprising finely divided particulate material adhered onto the protective coating layer.

BACKGROUND

Various materials used in building construction and other civil engineering projects such as roads and bridges are susceptible to water penetration resulting either from their inherent properties or imperfections such as cracks or pores. Reducing or eliminating water penetration through structures formed of these materials often is desirable such as for below-grade building walls, and may be critical in certain structures, such as those which house expensive electrical equipment, or tunnels which permit passage of vehicular or pedestrian traffic under bodies of water.

In conventional waterproofing applications, the waterproofing material is "post applied" to an existing concrete structure. In other words, a water-proofing agent is coated or laminated onto pre-formed structures; the waterproofing agent is then applied after the concrete is shaped and cured. Available conventional waterproofing agents include ethylene propylene diene monomer (EPDM) sheets, polyvinyl chloride sheets, neoprene sheets, bentonite panels, built-up asphalt systems, coal tar-based, and other asphalt-based compositions. Asphalt-based compositions are currently preferred; most preferred are preformed, flexible sheet-like waterproofing laminates of a support film(s) and a bituminous layer(s) such as described in U.S. Pat. Nos. 3,741,856; 3,853,682; and 3,900,102. Bituthene® brand of waterproofing is an example of a popular commercial membrane.

In many inner-city construction projects, the concrete foundation of one structure is poured very close to the foundation and/or property line of its neighbors. In these situations, a permanent concrete form, typically constructed using wooden planks, is assembled along the exterior of the foundation. This is referred to as "vertical lagging" or simply "lagging". During a lagging operation, it is virtually impossible to apply a conventional post applied waterproofing membrane to the cured exterior of the foundation because the exterior surface of the concrete is facing against the lagging form and thus cannot be exposed or rendered accessible for application of a waterproofing membrane.

Accordingly, attempts have been made to affix a pre-applied waterproofing membrane to the lagging form before the wet concrete is poured. Pre-applied waterproofing systems have been limited to bentonite based products including Volclay Panels, Paraseal, and Claymax. These products rely on the ability of the bentonite clay to expand on contact with water and create an impermeable layer to water migration. However, the rigidity of the lagging material/structure actually prevents the formation of an expanded wet clay layer of a desirable density high enough to qualify the material as impermeable. Of primary concern is the unevenness and the voids in the lagging substrate which may prevent the formation of the impermeable clay layer.

Conventionally preferred asphaltic based waterproofing membrane systems have several significant deficiencies when applied with the adhesive facing out in a lagging situation. First, they tend to oxidize during short periods of outdoor exposure and "mud cracks" develop on the adhesive surface. The oxidized surface does not bond to the post cast concrete (i.e. concrete that is subsequently cast). Second, the exposed adhesive surface of the waterproofing membrane tends to become fouled by the elements and by dust. Accordingly, it would be desirable to have an essentially non-tacky waterproofing membrane which can be pre-applied to a concrete form, resist chemical and physical changes from real time outdoor exposure, and develop a strong, fully-adhered bond to the post cast concrete structure (ie. the concrete structure which is formed subsequently to the application or installation of the waterproofing membrane).

An objective of the present invention is to provide a waterproofing membrane which can be pre-applied to a concrete form and which can adhere strongly to the post cast concrete.

It is also an objective to provide a waterproofing membrane to resist chemical and physical changes during outside exposure and still have the capability for forming a strong and intimate bond to post-cast concrete.

It is further an objective to provide a highly weatherable waterproofing membrane which is essentially not tacky to the touch.

Also, it is an objective to provide a method for pre-applying waterproofing membranes which become fully adhered to the resulting post cast concrete structure.

It is yet another objective to provide a novel waterproofing post cast concrete structure.

SUMMARY OF THE INVENTION

The invention provides a membrane having a carrier layer, first adhesive layer, and protective coating layer that permit cementitious materials to be cast against them and bonded thereto when allowed to cure or set. Exemplary membranes comprise a second adhesive layer on the backside of the carrier to permit adhering to substrates and/or a layer of finely divided particulate material disposed-upon the protective coating layer. The particulate material further reduces the tack of the adhesive and protective coating layers, such as to permit foot traffic while still providing the ability to bond with cast cementitious materials.

Thus, an exemplary membrane comprises a carrier layer having first and second major faces; a first pressure-sensitive adhesive layer adhered on said carrier first major face; a protective coating layer coated onto said first adhesive layer; said first pressure-sensitive adhesive and protective coating layers being operative to bond with a cementitious material cast against the membrane and allowed to cure; and a second pressure-sensitive layer adhered onto said carrier second major face, said second adhesive layer being operative to adhere the membrane onto a substrate such that a cementious material can be cast against said first adhesive layer and said protective coating layer.

A further exemplary membrane comprises a carrier layer having first and second major faces; a first pressure-sensitive adhesive layer adhered on said carrier first major face; a protective coating layer coated onto said first adhesive layer; a carrier layer having first and second major faces; a first pressure-sensitive adhesive layer adhered on said carrier first major face; a protective coating layer coated onto said first adhesive layer; said first pressure-sensitive adhesive and protective coating layers being operative to bond with a cementitious material cast against the membrane and allowed to cure; and a layer of finely divided particulate material adhered onto said protective coating layer, said particulate layer being operative to permit a cementitious material to be cast against said first adhesive layer and said protective coating layer and bonded thereto when allowed to cure.

Exemplary methods for waterproofing, involving the exemplary membranes above, are also disclosed and set forth hereinafter.

DETAILED DESCRIPTION OF THE INVENTION

Figure 1:
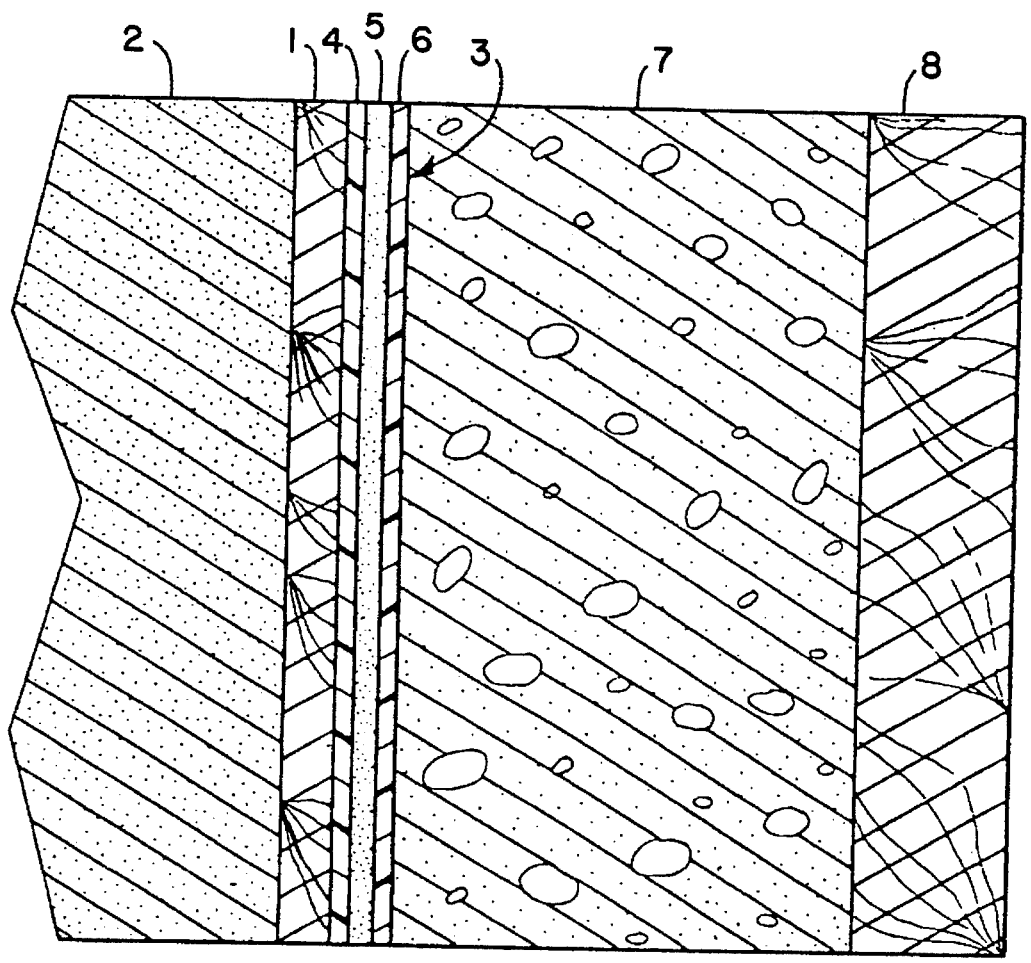
FIG. 1 is a lateral cross-sectional representation of an exemplary waterproofing membrane of the present invention.
Figure 2:
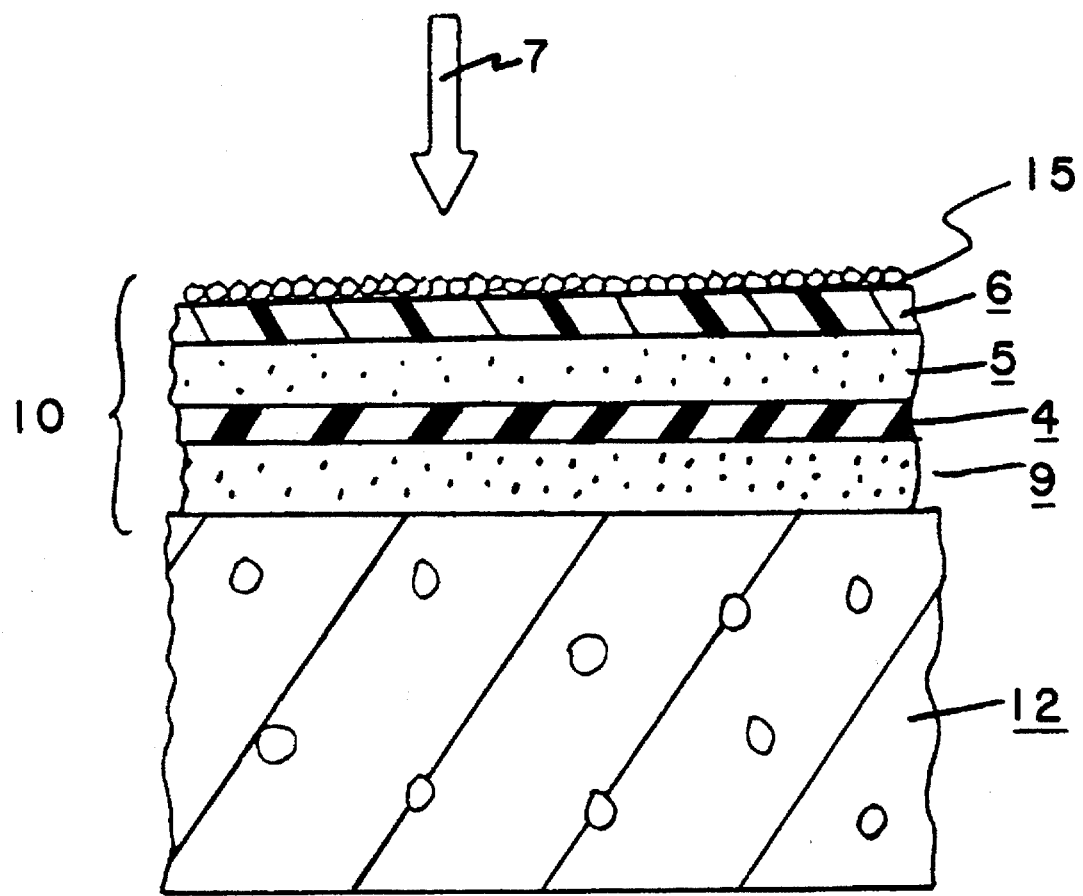
FIG. 2 is a cross-sectional representation of another exemplary membrane adhered onto a horizontal concrete deck.

As shown in FIG. 1, an exemplary membrane of the invention comprises a carrier layer 4, having a first pressure-sensitive adhesive layer 5, and a protective coating layer 3. FIG. 2 shows a further exemplary membrane having a second adhesive layer 9 on the backside of the carrier layer 4. The first and second adhesive layers may comprise bituminous or non-bituminous adhesives. Preferably, the first adhesive layer 5 is non-bituminous, as will be further defined hereinafter, and the second adhesive layer 9 preferably comprises a bituminous layer. Another exemplary membrane comprises a carrier layer 4, an adhesive layer 5, a protective coating layer 6, and a finely divided particulate material layer 15 (as shown in FIG. 2).

The carrier layer of the present invention can be fabricated from a thermoplastic, rubber, or metal in the form of a continuous film, a woven material, glass, or a non-woven material. Thermoplastics particularly suited for use in the present invention include high density polyethylene (HDPE), polyethylene terephthalate (PET), polystyrene (PS), polyvinyl chloride (PVC), polyamides (PA), or combinations thereof. The carrier layer may comprise a laminate comprising two or more sheets.

Preferred carriers are thermoplastic films of HDPE, PET, or PVC. The most preferred carrier is a HDPE film. The thickness of the carrier film is from about 0.002 inches to about 0.030 inches, preferably about 0.016 inches.

In preferred membranes, especially those used outdoors, the first adhesive layer 5 comprises a non-bituminous or synthetic adhesive, and the protective coating preferably comprises an acrylic.

As used herein, the term "synthetic adhesive" refers to non-bituminous or non-asphaltic adhesives. Exemplary non-bituminous, or synthetic, adhesive layers of the present invention are selected from butyl rubber based adhesives, polyisobutylene based adhesives, polyisobutyl based adhesives, acrylic based adhesives, vinyl ether based adhesives, styrene-isoprene-styrene based (SIS) adhesives, styrene-ethylene-butylene-styrene based (SEBS) adhesives, styrene-butadiene-styrene based (SBS) adhesives, and combinations thereof. Pressure-sensitive adhesives are preferred. Preferably, the synthetic adhesive is a pressure sensitive hot melt adhesive block copolymer of SIS, SBS or SEBS. Most preferably, the synthetic pressure sensitive hot melt adhesive is based on an SIS block copolymer. For a more detailed description of pressure sensitive adhesives, see Satas, *Handbook Of Pressure Sensitive Adhesive Technology*, by Van Nostrand Reinhold Company, Inc. (1982), incorporated herein by reference.

The non-bituminous or synthetic adhesive layer can optionally contain typical additives, such as light absorbers (i.e. carbon black, benzotriazoles, etc.), light stabilizers (i.e. hindered amines, benzophenones), antioxidants (i.e. hindered phenols), fillers (i.e. calcium carbonate, silica, titanium dioxide, etc.), plasticizers, rheological additives, and mixtures thereof. Preferred synthetic adhesive layers contain light absorbers, light stabilizers, and antioxidants.

It has further been discovered that the adhesion to post cast concrete is improved when the non-bituminous adhesive layer has a penetration greater than about 30 decimillimeters (dmm) (150 g, 5 sec., 70° F.) as measured according to ASTM D 5-73, incorporated herein by reference.

The "adhesive" nature of the non-bituminous pressure sensitive adhesive layer has the added benefit in that side laps and end laps of the membrane are easily formed. The preferred thickness of an exemplary non-bituminous adhesive layer of the present invention is from about 0.005 inches to about 0.080 inches, preferably greater than about 0.020 inches.

The protective coating layer 6 of the present invention is intended to have minimal tack and protects the synthetic adhesive from dust, dirt, and the elements (particularly sunlight). At the same time, the protective coating layer does not hinder the ability of the membrane to form a fully adhered strong bond to the post cast concrete and the resulting structure.

The protective coating layer material is selected from the group consisting of styrene butadiene rubber based (SBR) coatings, carboxylated SBR based coatings, acrylic based coatings, polyvinylidene chloride based (PVDC) coatings, polyvinyl chloride based (PVC) coatings, ethylene vinyl acetate copolymer based (EVA) coatings, ethylene ethyl acetate copolymer based (EEA) coatings, polychloroprene based coatings, polyester based coatings, polyurethane based coatings, styrene-isoprene-styrene based (SIS) coatings, styrene-butadiene-styrene based (SBS) coatings, styrene-ethylene-butadiene-styrene based (SEBS) coatings, and combinations thereof. Preferred protective coatings are acrylic based coatings. Most preferred are styrene butylacrylate based coatings.

Elastomeric protective coatings are preferred. As used herein, the term elastomer means an elastic polymer having properties similar to those of vulcanized natural rubber; namely, the ability to be stretched to at least twice its original length and to retract very rapidly to approximately its original length when released. Elastomeric acrylic-based coatings are preferred; and elastomeric styrene butylacrylate based coatings are most preferred.

The protective coating layer may optionally contain typical additives, such as, light absorbers (i.e. carbon black, benzotriazoles, etc.), light stabilizers (i.e. hindered amines, benzophenones), antioxidants (i.e. hindered phenols), fillers (i.e. calcium carbonate, silica, titanium dioxide, etc.) plasticizers, rheological additives and mixtures .thereof. Preferred synthetic adhesive layers contain light stabilizers and fillers.

It has further been discovered that the adhesion to post cast concrete is greatly improved when the protective coating has a penetration greater than about 30 dmm (150 g. 5 sec., 70° F.) as measured according to ASTM D 5-73, incorporated herein by reference. The thickness of the protective coating is from about 0.001 inches to about 0.020 inches, preferably about 0.003 inches.

The geometric configuration of the present invention comprises a carrier, the synthetic or non-bituminous adhesive layer affixed to one face of the carrier, and the protective layer affixed to the exposed face of the synthetic adhesive layer. The layers can be affixed together by any means.

The preferred embodiment of the present invention comprises: a 0.016 inch high modulus thermoplastic HDPE carrier film; a 0.025 inch SIS block copolymer synthetic pressure-sensitive adhesive layer containing from 0 to about 10% carbon black (most preferably about 2%), 0 to about 5% benzophenone, and 0 to about 5% benzotriazole; and about 0.003 inch elastomeric styrene butylacrylate protective coating containing from about 0 to about 10% titanium dioxide (most preferably about 4%), 0 to about 5% stearically hindered tertiary amine light stabilizer (HALS) (most preferably about 2%).

Unlike conventional waterproofing laminates, which are post-applied to existing pre-formed concrete structures, the present waterproofing membranes may be pre-applied to a substrate, such as concrete, mortar, cement, shotcrete, grout, metal, particle board, gypsum board, plywood, a drainage device, a lagging form, or a combination thereof. Cementitious materials which may be cast against the membrane include concrete, cement, shotcrete, grout, mortar, or a combination thereof, can subsequently be cast against the membrane. The casting of gypsum-based materials is also contemplated.

The membrane is affixed to a substrate prior to post casting the cementious material. As used herein, a "form" can be any container or any portion of a container which contacts cast concrete. This includes horizontal and vertical surfaces. In most applications, the carrier is affixed to the form by mechanically fastening the sheet membrane along the side and end edges. Neighboring sheets are placed such that the mechanical fasteners are completely overlapped, creating a surface which is continuous and free of punctures. In horizontal waterproofing applications, the waterproofing membrane can merely be rolled out without any means of fastening, although it is preferred to adhere or fasten the membrane to the substrate. In applications where the form is permanent, such as in vertical lagging operations, the carrier can also be adhered to the form through the use of adhesives.

In the lagging form application, the present method involves applying a carrier/synthetic adhesive composition to a form (synthetic adhesive side exposed). Thereafter, the protective layer is painted or sprayed on. This insures fully adhered side and end laps, creating a continuous waterproofing barrier. It should also be pointed out that the present invention contemplates applying a carrier/synthetic adhesive/protective layer composition in a single step. Other exemplary variations on this theme are also contemplated.

After the cast concrete has set sufficiently, the interior forms(s) are removed and the exterior "lagging" form may be optionally removed. This determination of cure is within the general skill of the art.

As used herein, making a structure "waterproof" means eliminating the ability of water to penetrate the structure. The present invention is used to make waterproof structures constructed of materials such as concrete which are water-penetrable either inherently or as a result of imperfections such as cracks or pores. The present invention relates to a post cast concrete structure comprising the above waterproofing membrane adhered to all or part of the surface of the structure. Various civil engineering structures including, for example, building, bridges, roads, and tunnels, are made waterproof using the present invention.. Building foundations are the preferred structures.

Once the concrete has set, the membrane forms an essentially fully-adhered, strong bond to the post cast concrete. After seven days, adhesion is believed to be about 95% of its final value (assuming no backfill pressure). The bond strength is at least about 2 lb/in (2"/min. 70° F.) as measured by the method described in ASTM D903-49, incorporated herein by reference. It has been discovered that this fully adhered bond (adhesion greater that 2 lb/in) is formed even after the protective coating face is exposed to over 40 megajoules of ultra violet light/square meter (MJUV/m$^2$) of real time outdoor exposure (ASTM G7, incorporated herein by reference) prior to casting. In other words, after outdoor exposure to outdoor sunlight equivalent in energy of up to 40 MJUV/m$^2$, the waterproofing laminates of the present invention are operative to form a fully adhered bond with concrete cast subsequently against the pre-applied laminates, because the laminates are not cracked by the sunlight energy. The present inventors have discovered that the concrete does not form a bond at the "cracked" portions of the membranes.

Contemplated equivalents of the present invention include other carriers, synthetic adhesives and protective coatings with characteristics similar to the specific materials described above. Additionally, waterproofing layers or components which do not interfere with the present invention are also contemplated. Alternative methods which result in a waterproofed structure utilizing analogous waterproofing membranes are also contemplated.

FIG. 2 illustrates a further exemplary waterproofing membrane 10 of the present invention wherein the carrier sheet 4 has pressure-sensitive adhesive layer 9 and 5 on both sides to permit the membrane 10 to be adhered to a cementitious substrate 12, such as a concrete deck, and to bond with concrete that is cast and cured against the outward facing waterproofing adhesive layer 5 and protective coating layer 6. A release sheet 11, which may comprise silicone-coated paper or other known slip film materials, are preferably applied to the second adhesive layer 9 to permit the laminate 10 to be rolled up and delivered to the installation site.

The second waterproofing adhesive layer 9, located on the carrier sheet 4 opposite the second adhesive layer 5 and protective coating 6 layers, should be sufficiently pressure-sensitive to permit adhesion to cementitious substrates 10, such as concrete, cement, mortar, brick, stone, and the like. The second adhesive layer 9 may be comprised of a bituminous or non-bituminous waterproofing adhesive similar to the materials described above. However, since the second waterproofing adhesive layer 9 will not likely be exposed to sunlight and the elements, bituminous adhesives that are well-known in the waterproofing art may preferably be employed.

Bituminous adhesives which may be used in the second adhesive layer 9 preferably comprise natural or synthetic rubber, virgin or reclaimed, blended into bitumen to provide a smooth mix. Preferably, the bituminous adhesive comprises a processing oil, such as an aromatic oil, and the ratio by weight of bitumen/oil to rubber should preferably be in the range of 70:30 and more preferably 75:25 to 93:7.

The second waterproofing adhesive layer 9 provides a number of advantages. For example, the extra step of having to apply a waterproofing adhesive layer to a concrete panel or deck is avoided, and the expense of labor and time at a jobsite is consequently minimized. Reliance upon the use of a two-sided tape, as another example, with the attendant waste due to discarded release paper, is also avoided.

Exemplary membranes having the two adhesive layers 5 and 9 provide novel waterproofing uses. For example, the "double-sided" membranes are suitable for use in wet rooms (such as bathrooms, laundry rooms, mechanical rooms) which have an existing floor and a post applied cementitious overlay (e.g., grouting and ceramic tile which is fabricated upon the laminate 10 after the laminate is adhered to the floor).

The exemplary "double-sided" membranes 10 are also useful in roof construction. For example, the laminate 10 is adhered by its second waterproofing adhesive layer 9 against a concrete roofing deck, and a tile overlay is secured upon the laminate 10 using mortar or other cementitious compositions.

The "double-sided" membrane 10 can also be used in bridge deck construction in which the second adhesive layer 9 can be adhered to existing horizontal structural slabs, and a concrete wearing surface is cast upon exemplary non-bituminous/protective coating layers 5 and 6.

Exemplary membranes 10 having adhesive layers 5 and 9 on both sides are suitable for waterproofing the inner surfaces of tunnels. The excated tunnel is often lined with sprayed or cast concrete to provide a smooth surface. Subsequently, a waterproofing membrane is placed against this smoothened or levelled surface either directly or on top of a drainage medium or other intermediate layer. Thus, further exemplary membranes of the invention can be used in combination with known drainage devices, such as those having a polymeric core sheet and a water-permeable fabric attached to the core. A cementitious material such as concrete is then poured or sprayed against the concave, arched inner tunnel surface, and allowed to cure to form a bond between the membrane and concrete cast against it.

FIG. 2 also illustrates an exemplary membrane 10 of the invention which further comprises a layer 15 comprising finely divided particulate material. The term "finely divided particulate material" means and refers to granules, particles, powders, dust, or ground material. Such particulate material, for example, can comprise calcium carbonate, sand, silicate sand, cement, talc, titanium dioxide, carbon black, slate dust, granite dust, clay, and the like. Calcium carbonate and sand are preferred. The finely divided particulate material should preferably be adhered to the protective coating layer 6 as a separate layer. It is believed that the particulate layer 15 will be partially embedded into the protective coating layer. A preferred particle size range is about 0.1–1000 microns, and more preferably the range is about 0.2–100 microns. It is believed that the selection of suitable particle sizes would be within the skill of those in the art. The particle layer 15 size should preferably be sufficient to further reduce the tack on the surface of the membrane, yet be capable of allowing a cementitious material to be cast against it to bond with the underlying adhesive 5 and protective coating 6 layers.

The exemplary use of a discrete layer of finely divided particulate material 15 as discussed above is indeed deemed to be an additional patentable aspect of the present invention. U.S. Pat. No. 5,993,328 of Cogliano, owned by the common assignee hereof, teaches that sand and dust particles can be incorporated as a filler in a bitumen-covering coating layer. However, the present inventors have surprisingly discovered that non-bituminous adhesive-based membranes of the invention can still bond with post cast concrete even after the protective coating layer 6 is dusted with separate coating 15, and even after the separate coating 15 has been subjected to foot traffic in a horizontal installation.

Accordingly, further embodiments of the invention comprise a carrier 3, a non-bituminous waterproofing adhesive layer 5, a protective coating 6 disposed on the non-bituminous adhesive layer 5, and a layer of finely divided particulate matter 15 that is adhered to the protective coating layer 6. The membrane can be installed upon vertical cementitious substrates, such as concrete walls, as well as upon horizontal surfaces such as concrete decks, roofing decks, highways and roadways, and the like. In vertical applications, the particulate layer 15 can make the produce easier to handle and install.

In another exemplary membrane which employs the second waterproofing adhesive layer 9, both the carrier layer 4 and second adhesive layer 9 preferably extend beyond the width of the first adhesive layer 5, the protective coating layer 6, and the particulate layer 15 if used, such that the second adhesive layer of one membrane can be side-lapped onto the exposed (extended) carrier layer of an adjacent membrane so as to provide a unified barrier.

A number of methods for making exemplary waterproofing membranes of the invention are possible. One presently preferred method involves coating one side of a double-sided release liner (e.g., plastic or paper covered on both sides with silicone) with the protective coating layer 6, and winding this up into a roll. The protective coating 6 side of the roll can then be coated with a bituminous and more preferably a non-bituminous adhesive layer 5 (e.g., a styrene-isoprene-styrene based adhesive), which is then laminated to a carrier sheet 4 (e.g., a polyethylene film), and wound up into a master roll. To make a "double-sided" membrane, the master roll is unwound and the exposed side of the release liner is coated with the second waterproofing layer 9. This is then wound up, and the release liner is transferred from the protective coating side to the second adhesive layer 9 when the roll is again unwound (such as at the installation site).

An exemplary method for making an exemplary membrane of the invention comprises making the above-described "master roll" (which comprises the release liner, protective coating, non-bituminous layer, and carrier), and then removing the release liner to expose the protective coating layer 6. Finely divided particulate matter (e.g., sand or calcium carbonate powder) can then be applied directly to the protective coating layer 6.

An exemplary method of the invention for waterproofing comprises the steps of providing a substrate; providing a preformed membrane comprising a carrier layer having first and second major faces; a first pressure-sensitive adhesive layer adhered on said carrier first major face; a protective coating layer coated onto said first adhesive layer; said first pressure-sensitive adhesive and protective coating layers being operative to bond with cementitious material cast against the membrane and allowed to cure; and a second pressure-sensitive layer adhered onto said carrier second major face, said second adhesive layer being operative to adhere the membrane onto a substrate such that a cementitious material can be cast against said first adhesive layer and said protective coating layer; adhering said second adhesive layer of said membrane onto said substrate; and casting against said adhered membrane a cementitious material which, when allowed to set, is bonded to said first adhesive layer and protective coating layers.

Another exemplary method comprises providing a substrate; providing a preformed membrane comprising a carrier layer having first and second major faces; a first pressure-sensitive adhesive layer adhered on said carrier first major face; a protective coating layer coated onto said first adhesive layer; and a finely divided particulate material layer adhered onto said protective coating layer, said first adhesive layer, protective coating layer, and particulate layer being operative to permit a cementitious material to be cast against the membrane and to be bonded therewith when cured; and disposing against said substrate said carrier layer of said membrane; and casting against said membrane a cementitious material which, when allowed to set, is bonded to said particulate layer, protective coating layer, and first adhesive layer.

In a further exemplary method of the invention, a membrane having a carrier layer 4, first adhesive layer 5, a protective coating layer 6, and a particulate layer 15 is used in known clay heave systems. For example, see GB 2,252, 988 A, published Aug. 26, 1992. Thus, the membrane, for example, is loose-laid upon a substrate which may comprise wooden planking under which are positioned flexible-wall containers. A cementitious surface, such as concrete, is cast onto the membrane. When cured, the concrete is waterproofed from beneath by the membrane upon which it has been cast. After a duration of time, the flexible-wall containers collapse, and the membrane is left essentially fully adhered to the underside of the concrete.

In further exemplary embodiments of the invention, based on the methods just described above, the substrate and said cast cementitious material, in combination with said membrane, forms a unitary structure when said cementitious material is allowed to set, said unitary structure comprising a floor, an inner tunnel wall, a foundation wall, a room floor, a roof deck, or a bridgedeck.

The following examples provide specific illustrations of the present invention, but are not intended to limit the scope of the invention as described above and claimed below:

EXAMPLE 1

Preparation of Waterproofing Membrane and Testing Procedure

A waterproofing sheet membrane is manufactured using a 20 mil HDPE carrier sheet coated on one face with 30 mil of an SIS based pressure sensitive hot melt adhesive, HM-1597 (H. B. Fuller, Vadnais Heights, Minn.), having a penetration of about 120 dmm. A styrene butylacrylate latex, Ucar-123 (Union Carbide, Cary, N.C.), having a penetration of about 50 dmm, is coated onto the adhesive side of the sheet membrane at a thickness of about 5 mil. Concrete is post cast against the protective coating surface of the waterproofing membrane composite after the protective coating surface has been exposed by up to 40 megajoules of ultraviolet light/square meter ($MJUV/m^2$) of real time weathering on a 34° south facing wall in Phoenix, Ariz. (ASTM G7). Adhesion is measured at a constant rate of extension (CRE) of 2 in/min at 70° F. with an Instron (Model 100) CRE testing machine following ASTM D903-49. The concrete is allowed to cure a minimum of seven days at room temperature before testing.

EXAMPLE 2

Adhesion of Waterproofing Membrane to Post-Cast Concrete

Samples of the waterproofing membrane described in Example 1 which experience no outdoor weathering develop excellent adhesion to the post cast concrete of greater than 9 lb/in. Adhesion of samples which have received real time exposure decreases sharply with increasing real time exposure and is about 0 lb/in after exposures of about 10 $MJUV/m^2$. Adhesion remains at about 0 lb/in for all exposure periods greater than 10 $MJUV/m^2$.

EXAMPLE 3

Effect of the Addition of Light Absorbers to the Adhesive

A polybutylene oil dispersion, 20 wt % carbon black, is added to the adhesive of the membrane composite described in Example 1. The resulting adhesive, HL2232-X (H. B. Fuller) having a penetration of about 205 dmm, is about 2 wt % carbon black. A styrene butylacrylate latex, Ucar-123 (Union Carbide) having a penetration of about 50 dmm, is coated onto the adhesive side of the sheet membrane composite (HL2232-X adhesive) at a thickness of about 5 mil. Adhesion is measured after real time weathering as described in Example 1. Samples which experience no weathering develop excellent adhesion to the post cast concrete of greater than 9 lb/in. Adhesion to the concrete decreases as the samples experience increased exposure time and is about 1 lb/in after 40 $MJUV/m^2$.

EXAMPLE 4

Effect of the Addition of Light Stabilizers and Absorbers to the Protective Coating A protective coating formulation was prepared by mixing a 32 wt % carbon black aqueous dispersion WD-2345 (Daniel Products, Jersey City, N.J.), a hindered amine light stabilizer Tinuvin 292 (Ciba Geigy, Hawthorne, N.Y.), a benzotriazole light absorber Tinuvin 1130 (Ciba Geigy), and a styrene butylacrylate based latex Ucar-123 (Union Carbide), under high shear. The resulting formulation has a penetration of about 55 dmm and is 5% carbon black, 2.5% Tinuvin 1130, 5% Tinuvin 292, and 87.5% Ucar-123 based on solids. A 5 mil layer of the formulated protective coating is applied to the sheet waterproofing membrane composite (HM-1597 adhesive) described in Example 1. Samples which experience no outdoor weathering develop excellent adhesion to the post cast concrete of greater than about 7 lb/in. Adhesion to the cured concrete decreases as the samples experience increased exposure time and is about 1 lb/in after 40 $MJUV/m^2$.

EXAMPLE 5

Effect of the Addition of Light Stabilizers and Absorbers to the Adhesive and Protective Coating The adhesive formulation (HL2232-X) described in Example 3 and the coating formulation described in Example 4 are used in the sheet waterproofing membrane composite described in Example 1. Samples which experience no outdoor weathering develop excellent adhesion to the post cast concrete of greater than 9 lb/in. Adhesion to the cured concrete remains relatively consistent at about 7 lb/in up to 20 MJUV/$m^2$. Adhesion does not fall below about 3 lb/in for samples which have experienced up to 40 MJUV/$m^2$ of real time outdoor exposure. The membrane is fully adhered over the entire area between the sheet membrane system and the cured concrete, resulting in an effective waterproofing barrier.

We claim:

1. A waterproofing membrane for adhering to freshly poured concrete compositions upon curing, comprising: a carrier layer having first and second major faces; a pressure-sensitive adhesive layer against said carrier first major face; an elastomeric protective coating layer contacting said adhesive layer and incorporating at least one additive material comprising a light absorber, light stabilizer, antioxidant, filler, plasticizer, rheological additive, or a mixture thereof; said pressure-sensitive adhesive layer and elastomeric protective coating layer being operative to bond with a cementitious material cast against them and allowed to cure; said waterproofing membrane further comprising a discrete layer of finely divided particulate material applied as a separate coating onto said protective coating layer containing said at least one additive material, said protective coating layer being made before said discrete layer of finely divided particulate material is applied thereupon as a separate coating, said particulate layer comprising particles having a size range of 0.1–1000 microns and being partially embedded as a separate discrete layer on said pre-made elastomeric protective coating layer containing said at least one additive material, said separately coated particulate matter being operative to permit foot traffic on said membrane while in a horizontal position and also operative to permit a cementitious material to be cast against and to form a waterproofing barrier with said adhesive layer and said elastomeric protective coating layer when said cementitious material is allowed to cure.

2. The membrane of claim 1 wherein said carrier layer comprises a continuous film sheet comprising a thermoplastic, rubber, glass, or metal material.

3. The membrane of claim 2 wherein said adhesive layer comprises a bituminous on non-bituminous adhesive.

4. The membrane of claim 3 wherein said finely divided particulate material comprises granules, particles, powder, dust or ground material.

5. The membrane of claim 4 wherein said finely divided particulate material comprises calcium carbonate, cement, talc, sand, granite dust, slate dust, clay, titanium dioxide, carbon black, or a combination thereof.

6. The membrane of claim 1 wherein said membrane is adhered to a substrate comprising a horizontal concrete deck, a roofing deck, a highway, or roadway.

7. The membrane of claim 1 wherein said membrane is disposed against a substrate comprising a concave, arched inner tunnel surface.

8. The membrane of claim 1 wherein said membrane is disposed against a substrate comprising a bridge deck.

9. The membrane of claim 1 wherein said carrier layer comprises a thermoplastic film having on said second major face a second pressure-sensitive adhesive layer.

10. The membrane of claim 1 wherein said protective coating comprises an acrylic, and said protective coating is coated over a pressure-sensitive adhesive layer which comprises a material selected from the group consisting of butyl rubber, polyisobutylene, polyisobutyl rubber, acrylic, vinyl ether, styrene-isoprene-styrene, styrene-ethylene-butylene-styrene, and styrene-butadiene-styrene, and said carrier layer comprises a thermoplastic film.

11. The membrane of claim 10 wherein said particulate matter has a particle size range of 0.2–100 microns.

12. The membrane of claim 11 wherein said carrier layer comprises high density polyethylene.

* * * * *